Sept. 2, 1958 C. E. JAHNIG 2,850,363
QUENCH SYSTEM FOR FLUID SOLID REACTIONS
Filed Jan. 22, 1953 2 Sheets-Sheet 1

Charles E. Jahnig Inventor

By /s/ Edwin M. Thomas Attorney

Sept. 2, 1958     C. E. JAHNIG     2,850,363
QUENCH SYSTEM FOR FLUID SOLID REACTIONS
Filed Jan. 22, 1953     2 Sheets-Sheet 2
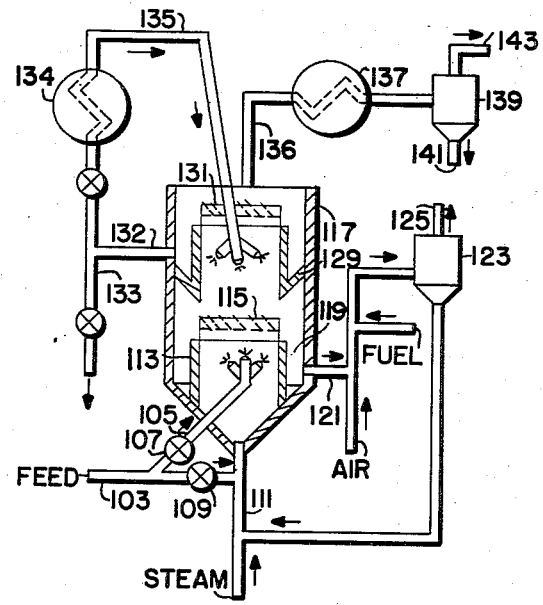
FIGURE-2
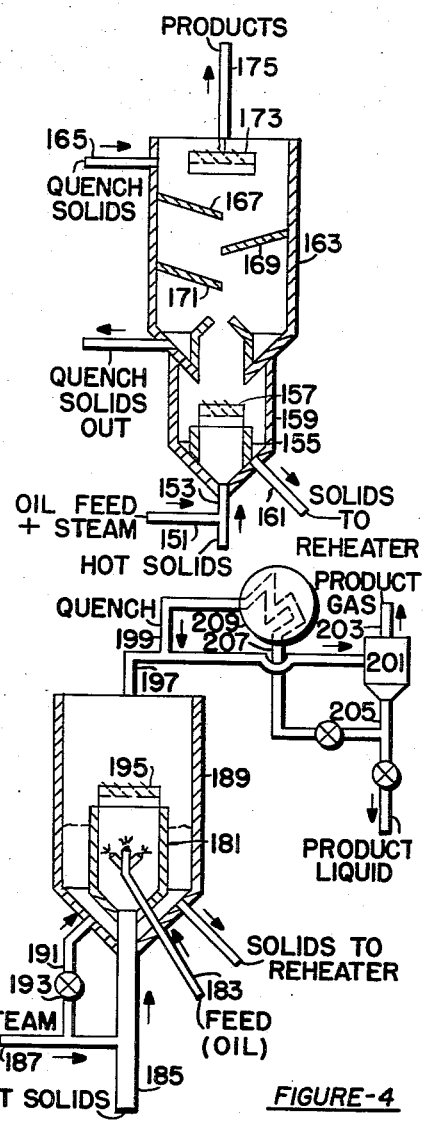
FIGURE-3
FIGURE-4
FIGURE-5
Charles E. Jahnig     Inventor
By _____ Attorney United States Patent Office 2,850,363
Patented Sept. 2, 1958

2,850,363

QUENCH SYSTEM FOR FLUID SOLID REACTIONS

Charles E. Jahnig, Red Bank, N. J., assignor to Esso Research and Engineering Company, a corporation of Delaware Application January 22, 1953, Serial No. 332,680

2 Claims. (Cl. 23—284)

The present invention relates to rapid quenching of vapor products in systems where the reaction is carried out in the presence of finely divided solids. In particular, the invention provides for rapid and efficient removal of hot solids from the product vapors, followed by immediate quenching of the vapors to prevent further reactions which may be undesirable. Thus, the separation and quenching can be completed in a fraction of a second, affording a degree of control over the reactions which has not generally been attainable with process systems.

The present process is particularly applicable to the separation of solids from and the quenching of gaseous products in the conversion of hydrocarbons, for example, as in coking, cracking, or otherwise converting hydrocarbon materials to produce various chemicals such as ethylene, aromatic compounds, and the like. It can also be used in other processes, as in short time distillation of heavy residual oils, or other materials which tend to degrade due to thermal reactions at their distillation temperature, unless the processing time is very short. Similarly, the system can be used for dehydrogenation of hydrocarbon oils, etc., by thermal or catalytic means, etc.

The invention is based primarily on the discovery that by handling the solids and the hydrocarbon materials being converted in a suitable manner the conversion may be stopped at the optimum point so as to obtain the maximum production of the most desirable reaction products. Specifically, the invention is based on the discovery that a strong centrifugal force may be applied in a particular manner to a stream of gaseous hydrocarbons carrying finely divided solids to effect substantially instantaneous separation, whereupon the vapors are immediately quenched to terminate or substantially terminate the conversion reaction.

One object of the invention is to utilize directional vanes in a reactor or at the outlet of a reactor to throw the catalytic or other finely divided solids out of contact with the products at the optimum instant so as to stop further conversion which leads to degradation of the products. Since undesirable thermal reactions may also occur in the vapors after removal of the solids, immediate quenching of the vapors is effected. This may be by spraying in or contacting the vapors with a suitable cooler liquid, solid, or gas. Alternatively, a vaporizable liquid may be used such as a product cut. A major advantage is that it is not necessary to quench the solids, which would greatly increase the heating and cooling load and result in a large increase in operating cost. More specifically, the invention makes it possible to carry out the steps of reaction, solids separation, and quenching, with a much shorter contact time than has been feasible heretofore.

For example, when hydrocarbons, especially hydrocarbon residues, are subjected to coking operations to make chemical raw materials it is well known in the art that it is usually desirable to carry out the coking at low pressure and at high temperature, for example, 1100° to 1800° F., or higher. A very short gas contact time is used, for example, 0.2 to 1.0 second or less; usually about one-half second or less, and then the reaction is suddenly terminated. Under some conditions lower temperature ranges may be suitable for coking to make gas oils or other liquid hydrocarbons, chemicals or chemical raw materials. With proper control of contact time, and of course under suitable temperature conditions, etc., the production of desirable products and the like, or other raw materials for resins, plastics, etc., is at an optimum. Under reaction conditions of say 1300° F. and low pressure, and with a gas oil or residuum feed as is commonly used in chemical production, a gas contact time of about 0.5 second is suitable. In conventional equipment such as a cracking furnace, it has been difficult, costly and often impractical to attain the high temperature and short contact time desired. One problem is in obtaining sufficiently rapid heating of the oil feed to the very high temperature needed. If conversion proceeds too far, the valuable product materials tend either to degrade, crack, or to polymerize, with the production of products of much less economic value.

In many cases it would be desirable to carry out the reaction at well above 1300° F., for example 1500–1800° F., or even higher. However, with available processes this has generally been out of the question, because the optimum contact time is of the order of 0.1 second or less, and a conventional furnace is not suitable for heating the oil feed to reaction temperature and supplying the high heat of reaction, while maintaining the desired short residence time. The present invention makes possible such high temperature treatment, coupled with the requisite short contact time.

Hence in preferred processes according to the present invention a stream of liquid and/or vaporous hydrocarbons, preheated to a suitable temperature (below reaction temperature), is intermixed with a stream of highly heated finely divided solids, to heat the feed to reaction temperature virtually instantaneously. These streams of feed stock and solids, suitably mixed together, are passed for a short controlled period of time through the reactor and then they should be separated as quickly as possible and quenched to prevent the degradation mentioned above. Alternatively, if the solids can be quickly cooled, the conversion reaction is effectively terminated, but this cooling of the solids involves the transfer of vast quantities of heat and high heat losses if that heat cannot be utilized efficiently and economically. It is preferred to quench the products without quenching the solids.

It has been previously proposed that hydrocarbons can be converted to chemicals of the general type mentioned above, by introducing the hydrocarbon oil and a stream of preheated solids into a short so-called transfer line reactor. From this reactor the products go directly into a cyclone separator from which the solids are removed in one path and the gaseous products are taken as rapidly as possible through another path to a quencher. Unless the separation of the solids from the gaseous reaction products is done quickly, followed by immediate quench, considerable degradation occurs. With conventional cyclones, the gas residence time in the cyclone alone generally exceeds 0.5–1.0 second. This is often more than the entire reaction time desired. The present invention involves separation substantially effected in a very short reaction zone with minimum time lag. The vapor products may then be immediately quenched to prevent further reaction.

The invention will be more fully understood by reference to the accompanying drawings where several adaptations and modifications of the invention are illustrated. Referring to the drawings:

Figure 1A shows a plan view of a vane structure which forms an important element in the system of Figure 1;

Figure 1B is a transverse sectional view of the vane structure of Fig. 1A, taken along the line B—B of said figure;

Figure 2 shows a modification wherein feed flows upward, rather than downward as compared with Figure 1;

Figure 3 shows a system wherein solids may be used for quenching, e. g. where a suitable liquid quench stream is not available, or where for some other reason it is preferred to use solids for this purpose;

Figure 4 shows still another modification;

Figure 5 shows an adaptation of the separating mechanism to still another type of application;

Figure 6 shows a further variation.

Figure 1:
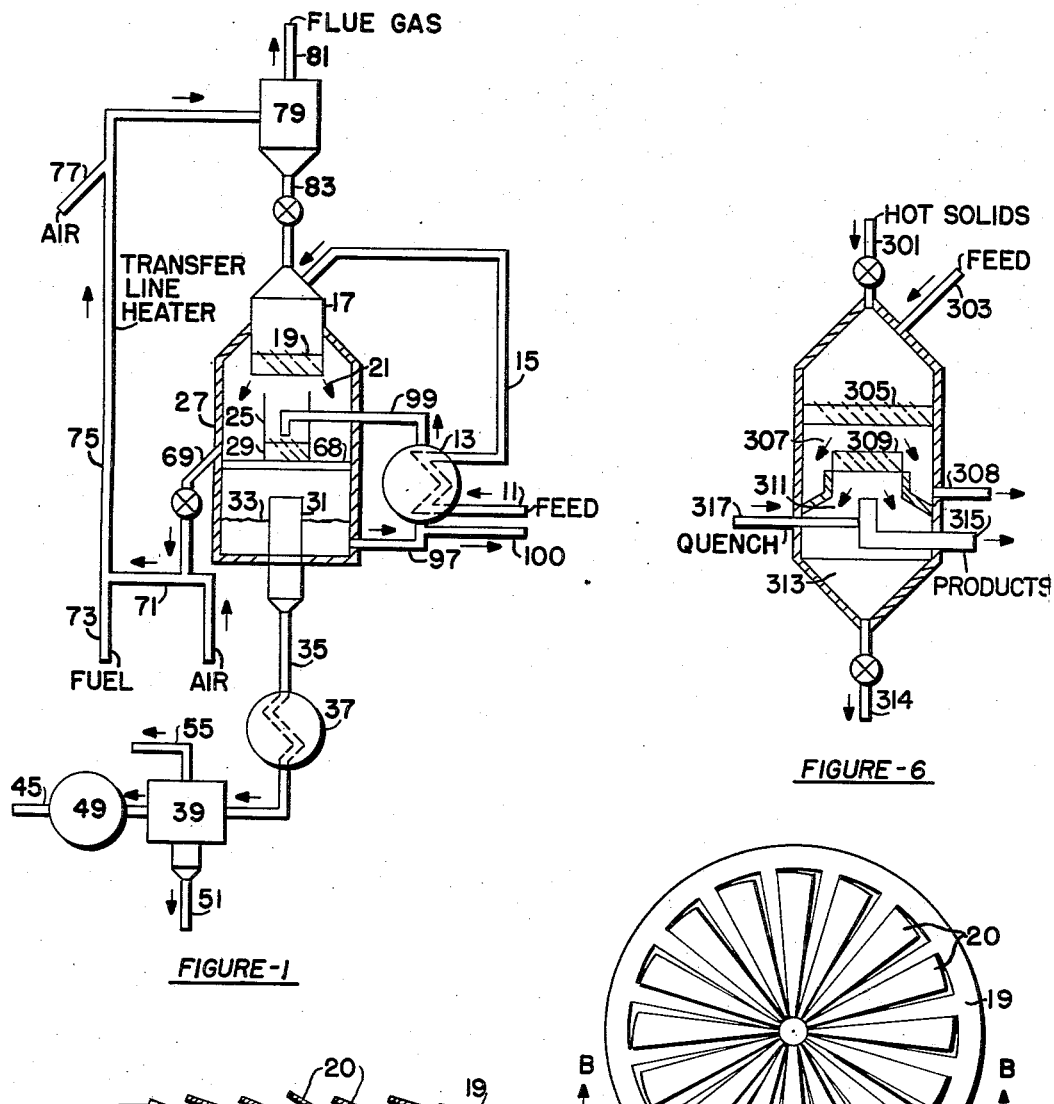
Figure 1 shows a diagrammatic view in elevation of a system or apparatus for carrying out the invention as applied to the cracking of oils under high temperatures and short time conditions to form olefins and aromatics, etc.

Referring first to Figure 1, the oil to be cracked is introduced into the system through line 11. This oil may be a vaporizable oil such as naphtha or gas oil, or a non-vaporizable oil such as petroleum residuum. The feed passes from line 11 through a preheater 13 and thence through a line 15 into a reactor 17. The temperature attained during passage through the preheating coil is limited to avoid coking of the preheating coil and this depends on the nature of the feed. In cases where light distillate oils are used, this temperature may be up to 900° F. whereas in cases where heavy residuum is used the temperature should be maintained below 700° F.

Steam, recycle gas or inert diluent may be added to the feed before or after the preheater. Hot solids are added from line 83, to heat the reactants to the desired temperature and supply heat of reaction. The reactor is provided with a system of vanes at the bottom as indicated at 19, the individual vanes 20 being radially arranged and set at such an angle that the downflowing stream of gaseous or vaporous materials containing finely divided solids is strongly deflected with a swirling motion so as to throw out the solids from the stream by centrifugal force as indicated by the arrows 21. This construction is shown in detail in Figs. 1A and 1B. The system is so arranged in Fig. 1 that the bulk of the gasiform material flows directly downward into a centrally located compartment 25 within a larger enclosure 27. The walls of the compartment 25 extend upwardly toward the vanes of the separator, being spaced far enough from the latter that the solids thrown outwardly by centrifugal force clear the conduit or quench compartment 25, but the main gas stream flows directly into it. Product vapors or gases are quenched by a liquid introduced through a line 99 to be described below. Compartment 25 is provided also with a vaned separator 29, similar to separator 19 (Figs. 1A and 1B), arranged to throw out the quench liquid by centrifugal force, and a second compartment 31 receives the downflowing gasiform stream. Liquid droplets from condensation as well as from the quench liquid are thrown outwardly by centrifugal force and collected in a compartment 33 in the bottom of vessel 27. The gases entering compartment 25 normally carry a small amount of residual solid particles. These are effectively removed by the spray system and are recovered as a slurry at 33, along with the liquids. The solids may be removed by filters, settlers, or by other means.

The hydrocarbon gas stream, substantially free of liquid particles or droplets is then passed downwardly through a line 35 and preferably through a heat exchanger 37.

The heat exchanger 37 extracts heat from the products which then pass into a liquid-gas separator indicated at 39. Hydrocarbon liquid products may be withdrawn at 49, any water entrapped in the products (from feed steam or other sources) being withdrawn through a line 51. The water may be taken off through line 45 or collected in a second or later stage of separation depending upon operating conditions. Gaseous and liquid products, from the separator 39, may be passed to a suitable recovery or fractionator mechanism. For example, the final gaseous products from the separator 39 can be withdrawn through line 55 to a gas compressor for recovery or for other suitable disposition.

The solids which are separated after the first stage of the reactor 17, as indicated at 21, are collected on a partition 68 and may be withdrawn through a line 69 where they are introduced along with a stream of air or other combustion supporting gas into line 71. Suitable aeration is provided throughout the system, as is well known in the art. If desired, fuel such as a suitable gas or oil may also be introduced through a line 73 and the solids are burned or reheated as they pass upwardly through a line 75 which may be a conventional transfer line heater. Additional air or other gas to support combustion may be introduced through another line 77 and the solids are then passed into a separator such as a conventional cyclone indicated at 79. The flue gases are taken off overhead through line 81 and the solids, now reheated to an appropriate temperature, are returned to the reactor through line 83.

In some cases, particularly where catalytic solids requiring regeneration are used, the solids may carry so much carbon or other combustible materials that an excess of heat may be obtained above the requirements of the reactor 17. In such a case, suitable heat removal may be provided in the heater system.

Part of the liquid material collected at 33 in the bottom of vessel 27 also may be circulated through a line 97 to a heat exchange or preheater 13 to preheat the feed stock. The liquid is then returned into the unit 25 through a line 99 to serve as a quenching medium as previously described. The liquid should be sprayed through suitable nozzles to give intimate contact and provide maximum quenching of the hydrocarbon gases from the reactor. These materials may also be withdrawn through the system 100, and extraneous scrubbing oil or other liquid may be added as desired.

Referring now to Figure 2 there is shown a system which in general utilizes the principles of operation of the system previously described, except that the direction of flow of the reactant materials is reversed. Thus, in Fig. 2 a feed stream is introduced through a line 103, being suitably preheated to a desired temperature in an obvious manner. If desired, the feed may be sprayed into the reactor through a line 105, suitable valves 107 and 109 being provided for this purpose. Alternatively the feed is mingled with a stream of steam, inert hydrocarbons, or other suitable gas or gases carrying fluidized preheated solids through line 111. In the reactor 113 the solids are separated after the desired short contact time by means of a vaned structure 115, similar to separator 19 of Figs. 1, 1A and 1B, which throws the solids by centrifugal action to the outer wall of the vessel 117 which encloses the reactor. The solids thus separated fall to the bottom of the annular space 119, from which they can be withdrawn through a line 121 to a reheating system similar to that of Fig. 1. The solids may be stripped to remove hydrocarbons. They are then mixed with air (and extraneous fuel if desired), and passed to a separator 123, which may be a conventional cyclone. Flue gases are taken overhead through a line 125 and the hot solids are returned to the reactor through a line 125 and the hot solids are returned to the reactor through line 127. Obviously such solids may be regenerated, etc. as in the previous example.

The stream of conversion products from the reactor 113 passes upwardly into a quenching zone comprising a second separator unit arranged within and spaced annularly from the receptacle 117 by a partition 129. They are quenched by a counterflowing liquid spray supplied through a line 135, and the liquid is separated from the gases by centrifuging. Here again a vaned structure 131, like nut 19 described above, is provided to impart a strong circular motion to the upflowing gas stream. This serves to separate the liquid particles or droplets from the upflowing stream and these particles fall into the annular space above the partition 129. From here the liquid may be withdrawn through a line 132 and removed through line 133. Alternatively, the liquid may be passed on to a heat exchanger 134 where it is cooled and returned through a line 135. The gaseous products are taken overhead through a line 136 to a heat exchanger 137 where they are cooled, usually causing some further liquid condensation. The condensed liquid may be separated from the gases in a cyclone separator 139, from which liquid products are withdrawn at the bottom through line 141 and gaseous products at the top through line 143.

Another system is shown in Figure 3 which is of the upflow design also. Here solids are used for quenching. An oil stream or other suitable feed stock preheated as desired is introduced through a line 151 where it is mixed with hot solids supplied from line 153 flowing upwardly in a fluidized stream containing a suitable fluidizing gas. The oil and the solids are mixed as they enter through line 153 into reactor 155. Separating vanes of the character previously described at 19, 20 are mounted at 157 to throw out the solids by centrifugal force, the solids falling into an annular space defined between reactor 155 and the outer vessel 159 which encloses it. Solids may be withdrawn from this annular space through a line 161 and carried to a suitable reheater or regenerator, not shown.

The gas stream, relatively free from residual solids, passes overhead into a vessel 163 which contains a downflowing stream of quenching solids introduced by a line 165 near the top. As shown, these solids flow down in cataract fashion over sloping plates 167, 169, 171, etc. so as to cool the upflowing gases as they are encountered. If preferred, other baffles such as horizontal perforated plates etc. may be used. The gaseous products strike another set of vanes 173 near the top of vessel 163 which gives them a final rotary motion to separate entrained solids. From this point they pass out of the system through a line 175 to a suitable recovery apparatus.

In Fig. 4 a system is shown having some of the features of that in Fig. 3 except that quenching is accomplished by a quenching medium, preferably liquid, introduced into the effluent line. In this figure a suitable feed such as a residual hydrocarbon oil is preheated and introduced as a spray into reactor 181 through a line 183. Hot solids are introduced in a fluidized stream from the bottom through line 185 and steam may be supplied through a line 187. A branch steam line may be introduced near the bottom of the outer vessel 189 through a line 191 controlled by valve 193 to keep the accumulating solids within the outer vessel fluidized. As in the previous embodiments a vaned structure for imparting circular movement to the gasiform stream is provided at the top of reactor 181 as shown at 195. It is similar to unit 19, previously mentioned.

The gaseous products flowing upwardly are separated from entrained solids by centrifugal action, the solids falling into the lower part of the outer vessel 189. The stream flows upwardly and outwardly through line 197, and a suitable quenching medium is introduced through a line 199. Quenching takes place in the line 197, some of the products becoming liquified. These are passed to a separator which may be of conventional cyclone type as indicated at 201, the product gases going overhead through a line 203 and the liquid product being drawn out at the bottom through line 205. The latter may be recycled through line 207 and heat exchanger 209 and used for further quenching.

Referring to Fig. 5 there is shown a system wherein the separating vanes of the type described above are utilized in series to separate the entrained solids from an upflowing stream in a conventional reactor 211. As shown, the system may be applied to a catalytic cracking regenerator where a stream of solids to be regenerated is introduced in fluid condition through a bottom inlet 213 and a grid 215. The gases from the regenerator pass upwardly through vanes 217 and 219 which are supported by a conical or sloping partition. Several sets of these may be provided or they may be arranged in an annular structure so as to throw the entrained solids out of the upflowing gas stream.

The solids so separated fall into a bed 221 from which they may be returned by gravity to the lower portion of the regenerator through a dip leg 223. Alternatively they may be drawn out of the regenerator through the line 225.

A second separating unit in series is provided above as indicated at 227 comprising sloping or conical partition 229 and one or more vaned separators 231, 233. Additional solids are removed in this stage and the gaseous products pass through openings 235 in a further partition 237 from whence they are led out of the system through a line 239. The solids so separated are returned to the bed through a dip leg 240.

Solids in fluidized condition may be withdrawn from the bed at the bottom of the regenerator indicated at 241 through a line 243 from whence they pass upwardly with the aid of fluidizing gases 245 and 247. This stream, which includes relatively coarse solids, introduced at the top with the very fine solids in the second separating stage will increase the average density of the latter and cause them to flow under better control through dip pipe 240 which leads from partition 229 down to the bed 241.

Fig. 6 shows an arrangement designed to give rapid and efficient separation of solids from a gas stream. Several stages of vanes are used in series to give more complete separation of solids. In this design, the flat surfaces of the inlet portion of many conventional cyclones is avoided, whereby the equipment is better adapted for high pressure service in that less thickness of the metal wall is required, for a given operating pressure. In operation, solids and gases enter at 301. Where a reaction is to be effected, feed is added at 303. The suspension flows through vanes 305, similar to vanes 19, 20 of Fig. 1B, positioned to induce swirling. The solids 307 are thrown to the wall and fall to a collection zone from which they are withdrawn at 308. The gases enter vaned section 309 and still contain some solids. These are separated at 311 and collect in zone 313, from which they are withdrawn at 314. A relatively clean gas stream is withdrawn through line 315. Quench may be introduced at 317 if this is desired.

The particular arrangement shown in Fig. 6 provides efficient separation of solids (or liquids) from gases in small compact equipment, resulting in cost savings due to small size and simplicity. Also, the unit can be of circular cross section to minimize the vessel wall thickness required when operating at superatmospheric pressure. Superficial gas velocity may be about 50–125 feet/second at vane 305, 75–125 feet/second at vane 309, and 100–175 feet/second in outlet line 315. It will be seen that with an overall height of say 10 feet from feed inlet to quench point, and an average velocity of about 75 feet/second, the effective contact time will be only 0.13 second. By adding purge gas to the solids collection zone (e. g. 307—308), this zone can be blanketed to minimize feed contact time. In many cases it will be desirable to provide an enlarged zone for solids accumulation, or the solids can be withdrawn directly to another hopper, standpipe, etc.

What is claimed is:

1. An apparatus of the character described including in combination a vessel provided at one end with a reactor for contacting hydrocarbons with high temperature, finely-divided solids, a central gas quenching conduit and a central gas withdrawal conduit, said reactor and conduits being in vertical alinement for the substantially unidirectional flow of gaseous hydrocarbons through said vessel, means for introducing a quenching medium into said gas quenching conduit, an annular partition extending across an intermediate portion of said vessel, said gas quenching conduit extending through the central portion of said annular partition, said gas withdrawal conduit extending through the end of said vessel opposite said reactor, means for introducing a unidirectional and rapidly flowing stream of contact solids into said reactor, means for introducing hydrocarbons into said stream in said reactor, a fixed vaned separator at the outlet end of said reactor for imparting rapid circular motion to said stream leaving said reactor to separate contact solids from gaseous conversion products by throwing said separated contact solids toward the inner wall of said vessel and beyond the central gas quenching conduit and being collected on said annular partition, said central gas quenching conduit being adapted to remove the substantially solids-free gaseous conversion products as they flow substantially unidirectionally through said vessel, a second fixed vane separation arranged at the outlet end of said central gas quenching conduit and downstream from said reactor to impart rotational motion to gaseous conversion products passing therethrough sufficient to separate liquid from said conversion products by centrifugal force by throwing the liquid outwardly toward the inner wall of said vessel while permitting substantially unidirectional flow of said gaseous conversion products through said gas withdrawal conduit and collecting the separated liquid in said vessel in the area around said gas withdrawal conduit, and means for withdrawing liquid from said liquid collecting area.

2. An apparatus of the character described including in combination a vessel provided at one end with a reactor for contacting hydrocarbons with high temperature, finely-divided solids, a central gas quenching conduit and a central gas withdrawal conduit, said reactor and conduits being in vertical alinement for the substantially unidirectional flow of gaseous hydrocarbons through said vessel, means for introducing a quenching medium into said gas quenching conduit, an annular partition extending across an intermediate portion of said vessel, said gas quenching conduit extending through the central portion of said annular partition, said gas withdrawal conduit extending through the end of said vessel opposite said reactor, means for introducing a unidirectional and rapidly flowing stream of contact solids into said reactor, means for introducing hydrocarbons into said stream in said reactor, a fixed vaned separator at the outlet end of said reactor for imparting rapid circular motion to said stream leaving said reactor to separate contact solids from gaseous conversion products by throwing said separated contact solids toward the inner wall of said vessel and beyond the central gas quenching conduit and being collected on said annular partition, said central gas quenching conduit being adapted to pass along the substantially solids-free gaseous conversion products as they flow substantially unidirectionally through said vessel, and means whereby quenched products are removed from said vessel through said gas withdrawal conduit.

References Cited in the file of this patent

UNITED STATES PATENTS

| | | |
|---|---|---|
| 1,847,452 | Vaughan | Mar. 1, 1932 |
| 1,934,674 | Lichtenthaeler | Nov. 7, 1933 |
| 2,422,501 | Roetheli | June 17, 1947 |
| 2,437,334 | Roetheli | Mar. 9, 1948 |
| 2,515,155 | Munday | July 11, 1950 |
| 2,580,317 | Pekar et al. | Dec. 25, 1951 |
| 2,671,796 | Garbo | Mar. 9, 1954 |
| 2,698,672 | Burnside | Jan. 14, 1955 |